June 22, 1965 R. BLOXHAM 3,190,823
SELECTIVE OXIDATION DEPOLLUTION PROCESS AND APPARATUS
Filed Jan. 13, 1961

INVENTOR.
Robert Bloxham
BY
Townsend and Townsend
attorneys 3,190,823
SELECTIVE OXIDATION DEPOLLUTION
PROCESS AND APPARATUS
Robert Bloxham, Livermore, Calif., assignor to Coast
Manufacturing and Supply Company, Livermore, Calif.
Filed Jan. 13, 1961, Ser. No. 82,599
13 Claims. (Cl. 204—157)

This invention relates to the depollution of air. More particularly, it relates to the depollution of air by oxidation through the heating of the contaminants only in the air.

So much has been written in recent years about the necessity and desirability of controlling the growing problem of air contamination, often called smog, that no comment as to its importance is necessary. The problem is particularly acute in high density population areas where, in addition to a considerable amount of contribution by industry to contamination of the atmosphere, automobile exhaust is a major contributor to the problem.

Although the embodiment of the present invention to be described is particularly adapted for enhancing combustion of exhaust gases in industrial installations, it is contemplated that the invention in its broader aspects may be adapted for use with automobile and truck internal combustion engine exhaust systems.

Numerous attempts have already been made to alleviate the atmospheric pollution problem created when exhaust gases from industrial processes are discharged into the atmosphere. The main attempts have been along the line of what is now considered a conventional afterburner, through which the exhaust gases of the industrial processes are passed before being discharged into the atmosphere. Generally, a conventional afterburner consists of a heating chamber which is usually heated by direct fire. The entire mass is usually raised to about 1500° to 1600° F. and the polluted exhaust effluent of the industrial process is passed through the heating chamber. While this is a very effective method for oxidation of contaminants, it is exceedingly wasteful of fuel. For example, in a process which requires a working temperature of 200° F. in order to produce the desired final product, it would require 5-7 times the fuel costs of the process to operate the afterburner and depollute the exhaust gases coming from the process. This precludes the use of conventional afterburners for most industrial and commercial applications.

The other principal method developed for control of atmospheric pollution is a type of equipment employing catalytic combustion. This type of equipment is very expensive to manufacture and has the serious disadvantage of its catalytic elements being susceptible to contamination, especially from silicones, making them ineffective through this so called "poisoning." This requires periodic and all too frequent rejuvenation or replacement. Moreover, the operation of catalytic combustion equipment requires that the effluent gases be raised to at least 600° F. for the catalytic reaction to start. Therefore, to make the equipment reasonably efficient, an expensive heat exchanger is required.

Both of the above methods, especially the conventional afterburner method, create nitrogen oxides which are considered a serious air pollutant in themselves. This is due to the fact that the creation of nitrogen oxide compounds is in direct relation to the gas temperature and both methods employ relatively high gas temperatures.

Accordingly, it is a principal object of the present invention to provide a depollution oxidation process that is highly efficient because it has the feature of permitting heating of only the contaminants and does not require heating of the ambient atmosphere. A further object is to provide a system and apparatus for carrying out the foregoing process. One important feature and advantage flowing from the use of the present invention is found in the fact that air which has been depolluted by this invention is not accompanied by nitrogen oxides which are formed when other depollution processes or apparatus or systems are used. Additional objects, features, and advantages of the present invention will become apparent as the following detailed disclosure progresses when read in conjunction with the accompanying drawings in which:

Figure 1:
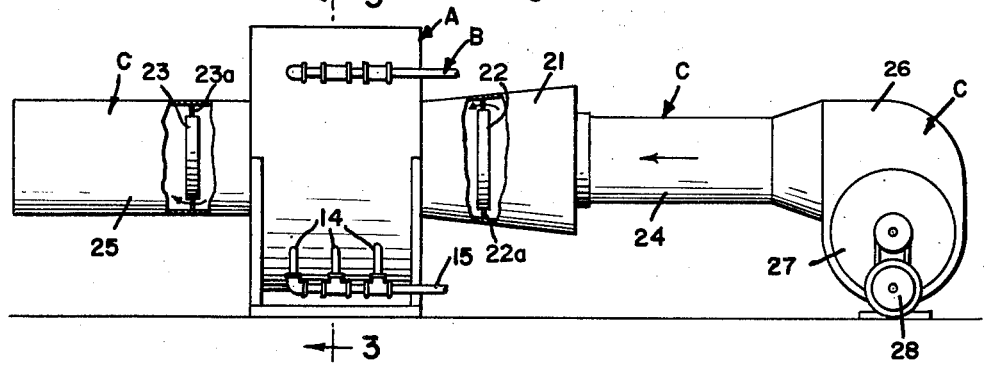
FIG. 1 shows a device in side elevation, partially broken away, suitable for carrying out the process of the present invention.

All of the foregoing objects have now been accomplished by the present discovery which provides a method for removing the pollutants in air by oxidation which comprises selectively heating the oxidizable pollutants without raising the ambient temperature of the air substantially.

The foregoing process is particularly advantageous in industrial oven processes where the air carrier of the contaminants must comply with the fire regulations of insurance companies. These regulations require that the ratio of air to hydrocarbon solvents or other combustible contaminants is kept very high. Therefore, the greatest volume of effluent discharged in the atmosphere will, of course, be nitrogen and oxygen, the principal constituents of air, comprising approximately 96 to 98% of the usual effluent. Only the remaining 2% to 4% are the heteropolar gases and smoke particles that contain the contaminants. Therefore, the present process which supplies heat to only the 2% to 4% of the total effluent containing the contaminants, and raises only this small portion of the total gas volume to the ignition temperature required for oxidation, is extremely efficient and inexpensive as compared with other depollution processes.

While the present invention contemplates the use of any means of selectively heating and thereby oxidizing the contaminants, it has been found that the bombardment of air containing oxidizable contaminants with infra-red radiation is particularly efficient and convenient. It is therefore the preferred means for effecting the selective oxidation required by the process of the present invention. For convenience, the infra-red radiation means will be used to more fully and completely describe the present invention.

The depollution or removal of the contaminants occurs through a conversion of these contaminants to oxides which are harmless or innocuous as compared to the starting material to be oxidized. For examples, hydrocarbons may be converted to carbon dioxide and water, and carbon monoxide may be converted to carbon dioxide by the present process.

The selective oxidation by heating is accomplished by bombarding the contaminated gas in the presence of oxygen with, in the preferred embodiment, infra-red radiation. The contaminating smoke particles, hydrocarbons, carbon monoxide, and the like, absorb sufficient radiant heat energy to raise them to their ignition temperature whereby they are oxidized in the presence of excess oxygen, which is of course present in air.

The usual predominant gases of air, that is, oxygen and nitrogen, do not absorb significant amounts of radiant energy. Therefore, the average exit temperature of gases subjected to the present process is relatively low and the heat quantity required to initiate the oxidation reaction of the contaminants is extremely low.

The phenomenon noted in the foregoing paragraph may be explained by the fact that it is known that the radiation (therefore also the absorption of radiant heat) of heteropolar gases is quite high as compared to the symmetrical molecules of gases such as oxygen and nitrogen. Among these heteropolar gases of interest are gases such as carbon monoxide, hydrocarbons such as ethyl alcohol, acetone, toluene, phenol, and water vapor. Smoke being composed of solid and liquid particles, readily absorbs radiant energy.

In carrying out the process of the present invention, it has been found to be particularly successful to establish a flow of air containing the oxidizable pollutants, and pass this flow of air through an infra-red ray emitting zone. Infra-red radiation may be generated therein by any of the methods known in the art. Since any solid body emits infra-red radiation when heated, there is an almost infinite number of materials that may be used. Since some are more efficient than others, better results will be obtained with these more efficient materials. For example, plastic fire bricks have been found to be particularly suitable for present purposes.

The solid selected may then be heated by any convenient method to cause the emission of a suitable amount of infra-red radiation. Thus, the solid may be heated by electrical heaters or by subjecting the solid to a gas flame for examples. In general, for most contaminants such as visible smoke and hydrocarbons, the surface temperature of the radiating body should be between about 1500° F. and 3000° F. However, the temperature may be either higher or lower depending upon the ignition temperature of the particular contamination.

Other mutually dependent variables include the rate at which the air is flowed through the emitting zone and the length of the emitting zone itself. All of these variables may be adjusted to any convenient point that is desired and still achieve the requisite degree of depollution by making compensating adjustments in the other variables. When selecting values for the variables, it is noted that optimum results may generally be obtained by adjusting conditions so that the flow of air absorbs about 400 B.t.u./hr./s.c.f.m Excellent results have been obtained by a choice of an air velocity of 450 feet per minute with a temperature of the emitting body at about 2100° F. and an emitting zone 24 inches long.

Regardless of the conditions selected it is important that an excess amount of oxygen be well mixed with the contaminants before the mixture enters the radiation zone. The exact oxygen ratio is not critical. However, a minimum of approximately 150% excess air over the theoretical required for the particular hydrocarbon or other contaminant present should be maintained for best results. The process will work for lesser or greater amounts of air, of course, but output efficiency may be impaired in the case of lesser amounts.

It has further been found that the optimum absorption of 400 B.t.u./hr./s.c.f.m. by the air flow may be readily obtained by employing a system comprising, in combination, a conduit having a longitudinal axis and infra-red radiation emitting means disposed about the perimeter of the conduit. As a result, radiation is directed from substantially all points on the perimeter of the conduit towards the inner area of the conduit. The radiation is thereby available for bombarding a flow of contaminated air through the conduit about substantially the entire periphery of the air flow. Such a peripheral bombardment of the air flow has been found to be particularly efficient and most likely to result in an exceptional degree of depollution of the air.

It has been further found that a system in which the air flow is restricted to the central portion of the conduit and caused to flow along the longitudinal axis thereof, is particularly suitable. By so restricting the air flow and thereby keeping the longitudinal velocity of air in the vicinity of the emitting means disposed about the perimeter of the conduit substantially slower than the velocity of air in the central portion of the conduit, the temperature of the emitting body is not lowered by passing air and is capable of maintaining the desired level of radiation. If air were permitted to flow in direct contact with the emitting body, a cooling of the body would result with a lessening of the radiation emitted.

It will be appreciated by those skilled in the art that the term infra-red radiation is not fixed within precise mathematical limits. In general however, it is defined as electromagnetic radiation whose wave lengths lie in the range from about .8 micron to about 1000 microns. The lower of these boundaries is set by the long wave length limit of the human eyes' sensitivity to red light and the upper limit by the short wave length limit to radiation which can be generated and measured by microwave electronic devices. As used throughout the specification and claims, the term infra-red radiation should be taken to mean radiation having the foregoing definition.

As mentioned above, the preferred source of infra-red radiation for the present invention is an incandescent solid body. Infra-red radiation may be emitted by systems other than hot bodies which are in approximate internal thermodynamic equilibrium, as for example, the emission by gases through which an electrical discharge is passed. Most of these other systems however, are not effective emitters and are seldom used as practical infra-red sources. Be that as it may, the present invention should not be construed as being limited to any particular source of the radiation, except as is required by the appended claims.

In carrying out the method of the present invention it is necessary to use sufficient infra-red radiation to oxidizably convert at least some of the pollutants in the contaminated air flow. It has been found that a bombardment about the entire periphery of the air being treated will cause sufficient infra-red radiation to impinge upon the air to achieve the desired results. Therefore, it is preferred to treat the air in such a manner. However, other systems and methods of bombarding the air with infra-red radiation that will convert at least some of the pollutants in the air to innocuous products is within the scope of the present invention.

It should also be noted that when an emitter temperature is used that is capable of causing an absorption by the air of at least about 400 B.t.u./hr./s.c.f.m. very efficient depollution is achieved. Higher emitter temperatures will not usually produce a substantially superior end product. Higher emitter temperatures do have the advantage of allowing the use of a higher air velocity through the radiation zone and still produce efficient depollution of the air.

Attention is directed to the accompanying drawings for an example of a device capable of depolluting air very efficiently in accordance with the present invention. With particular reference to FIG. 1, it will be seen that the apparatus is composed of three major parts shown generally by letters. These consist of a chamber A within which infra-red radiation is generated and in which contaminated air is bombarded thereby. Chamber A is provided with a means for producing infra-red radiation therein, a part of which is shown generally at B. Cooperating with A and B are a series of conduits and blowers C for directing a flow of air along a preselected path at a preselected rate through chamber A where it may be bombarded by infra-red radiation produced by B.

Figure 2:
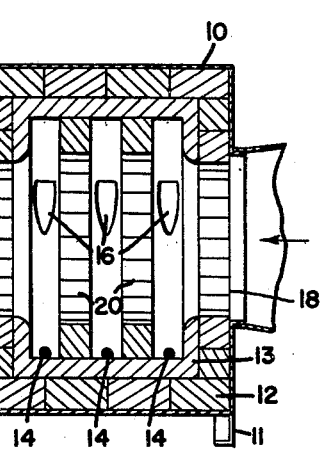
FIG. 2 is a side view in section of that portion of the apparatus of FIG. 1 in which the depollution reaction takes place.
Figure 3:
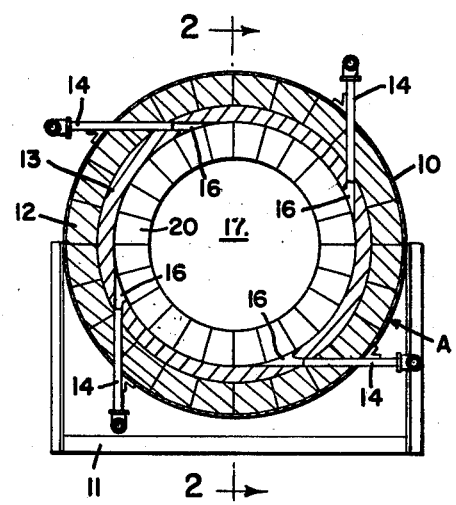
FIG. 3 is an end view in section of that portion of the apparatus of FIG. 1 in which the depollution reaction takes place and is the same portion of the apparatus as is shown in FIG. 2.

Turning first to a detailed description of chamber A, particular attention is directed to FIGS. 2 and 3. There it will be seen that chamber A comprises an annular elongated open ended conduit 10 supported by frame 11. Conduit 10 may be a hollow shell of any suitable and desired size and shape which permits passage of air therethrough. The perimeter of conduit 10 is provided with a layer of insulating bricks 12 to prevent an excessive amount of heat loss from the interior of the conduit.

Several layers of insulating bricks 12 may be employed to provide an even greater resistance to heat loss.

Interiorly of the insulating bricks 12, and forming a lining of a major portion thereof, is an infra-red radiation emitting material 13. Emitting material 13 may be inserted as a lining for insulating bricks 12 or disposed in any suitable position permitting the radiation emitting therefrom to impinge upon air flowed through conduit 10. As previously noted, emitting body 13 may be any suitable solid material. Rammed plastic brick has been found to be particularly suitable for present purposes as an emitting material although many other materials could be chosen with equally good results.

Plastic brick 13 is heated by a suitable means to raise its temperature to a point where the rate of emission is sufficient to cause at least some depollution of air flowed through conduit 10. As previously noted, the temperature of the plastic brick is preferably about 2000° F.

The particular means for heating plastic brick 13 shown is a plurality of pipes 14. Premixed combustible gas is fed to pipes 14 through a main supply line 15 from a source not shown. Means for regulating the rate of flow of combustible gas to feed line 15 may also be provided but is not shown. Pipes 14 all terminate interiorly of conduit 14 at discharge ports 16. The pipes are disposed within conduit 10 so that discharge ports 16 are positioned tangentially to the inner surface of plastic brick 13. As a result, when a combustible gas is flowed through pipes 14 and ports 16 and ignited, the inner surface of plastic brick 13 will be heated to the desired temperature. In the preferred embodiment, pipes 14 are disposed in sufficient quantity and position so that at least substantially all of the plastic brick that is oriented so that radiation emitting therefrom will impinge upon polluted air in channel 17 will be heated thereby. This produces a greater magnitude of radiation per unit area of plastic brick than would otherwise be possible.

In operation the contaminated air flows through the inner channel 17 of conduit 10, entering through input 18 and leaving through output end 19 of conduit 10. It will be appreciated by those skilled in the art that such a flow of air in the absence of further precautions would, while flowing through conduit 10, cause a decrease in the temperature of plastic brick 13 as the air passed over the surfaces of said brick. This would in turn cause a decrease in the degree of radiation emitting from plastic brick 13. The problem may be at least in part overcome by increasing the amount of heat supplied to plastic brick 13, such as by increasing the amount of gas supplied through pipes 14. This merely continuously raises the temperature of plastic brick 13 as it is being lowered by the air flow and is obviously an inefficient and wasteful expedient.

The present apparatus provides an alternative method of preventing the lowering of the temperature of plastic brick 13 without loss of efficiency of the radiating body and without the added expense attendant the reheating of said body. This is accomplished by means of a plurality of concentric rings of refractory brick 20. Refractory brick 20 is disposed within conduit 10 proximate to plastic brick 13 and is fixed at longitudinally spaced apart locations within conduit 10. In operation, refractory brick 20 impedes and tends to prevent air from flowing in the vicinity of plastic brick 13. Thus, the great majority of air flows through channel 17 and the remaining exposed areas of plastic brick 13, which supply the desired radiation, are not substantially cooled by the passage of the air.

Refractory brick 20 may be any suitable material that will withstand the temperatures present within conduit 10 during the depollution process for a reasonable length of time. The height of the brick and the positioning of the brick or other suitable material should be such that will cause sufficient air turbulence or impedance in their vicinity so that the major portion of the air will tend to flow through center channel 17. The result is to cause the longitudinal velocity of air proximate to plastic brick 13 to be substantially slower than the longitudinal velocity of air flowing through channel 17. Most preferably the longitudinal velocity of the air proximate to plastic brick 13 should approach zero. While a plurality of concentric rings of refractory brick are employed in the preferred embodiment, any type of a barrier means or baffles that will assure that the longitudinal velocity of air proximate to the infra-red emitting means is substantially slower than the longitudinal velocity of air through channel 17 is contemplated.

As a further optional aid in directing the air flow through channel 17 instead of in the vicinity of plastic brick 13 and thereby causing its cooling, a hollow frusto-conical member 21 may be inserted at input end 18. The shape of this member will tend to cause the contaminated air to flow in the desired channel by focusing the air flow in the direction of the longitudinal axis of channel 17.

Additionally, in order to minimize radiation loss within conduit 10, radiation traps 22 and 23 may be interposed at the input and output ends 18 and 19. Traps 22 and 23 permit air to flow through conduit 18 substantially unimpeded but prevent infra-red radiation from leaving the interior of conduit 10. Radiation traps 22 and 23 may be of any suitable design known in the art and are shown schematically in FIG. 1 merely to indicate one appropriate position for them. In their simplest form radiation traps 22 and 23 may consist of no more than solid plates of a diameter sufficiently less than member 21 and duct 25 respectively, to permit a smooth flow of air through the apparatus. Trap 22 may be held in place within member 21 by a plurality of spokes 22a. Similarly, trap 23 may be held in place in duct 25 by a plurality of spokes 23a. This type of configuration will allow air to flow around the peripheral edges of the plates between spokes 22a at the input end and between spokes 23a at the output end. At the same time radiation emitting from the interior of conduit 10 is stopped when impinging upon plates 22 and 23.

Cooperating with chamber or furnace member A and radiation producing means B are duct 24 for transporting and directing contaminated air into frusto-conical member 21 (or directly into furnace member or chamber A) and duct 25 for directing depolluted air away from furnace member A and into the atmosphere. Associated with duct 24 is a means for causing air to flow through the foregoing apparatus. This air flow causing device comprises some suitable arrangement such as an elbow shaped conduit 26 connected to the source of polluted air not shown, and a blower device 27 cooperating therewith. The speed of the motor 28 in the motor blower device 27 may be regulated so that the rate of flow of air through the foregoing apparatus may be selected as desired.

As illustrative of the operation of this apparatus and the desirable results obtained by the previously described method, the following example is offered which should not be construed as limiting the invention in any respect.

*Example*

The apparatus described herein was used in the following experiment:

Smoldering rags soaked in plastic resin in a partially covered can was the source of smoke containing combustible contaminants employed. The smoke produced thereby was fed to the apparatus by a blower at an inlet velocity of 440 f.p.m., the volume of air processed being 1160 c.f.m. The temperature of the air at the input end of the furnace member was 70° F. Plastic brick in the furnace member serving as an emitter was heated by gas flames to about 2100° F. The temperature of the air coming through the output end of the furnace member was 450° F., the air therefore having absorbed 417 B.t.u./hr./s.c.f.m.

The effectiveness of the depollution process was determined by non-instrumented means. The exhaust coming from the furnace member was visually inspected with the sense of smell also aiding in determining the degree of cleaning. While the air being fed to the furnace member was black in color and quite strong in smell, the processed air leaving the furnace member would not smart the eyes and no odor was present. Most important, all visible smoke was gone.

It will be obvious to those skilled in the art that many modifications and changes may be made in the foregoing apparatus without departing from the scope of the present invention as limited only by the scope of claims appended hereto.

What is claimed:

1. A method for the depollution of air which comprises establishing a flow of air containing oxidizable pollutants through an infra-red ray emitting zone, generating infra-red radiation adjacent to said flow, directing said flow of air so that it is predominantly out of contact with the locus of the infra-red generation, and bombarding said flow with infra-red radiation to oxidize at least some of said pollutants to innocuous products.

2. A system for the depollution of air containing oxidizable pollutants comprising, in combination, a conduit having infra-red radiation emitting means, means directing a flow of air along a preselected path predominantly out of contact with said emitting means through said conduit and at a preselected rate so that the flow of air is subjected to heat predominantly infra-red in character thereby oxidizing at least some of the oxidizable pollutants as the flow of air passes through said conduit.

3. A system in accordance with claim 2 wherein absorption by the flow of air is about 400 B.t.u./hr./s.c.f.m., said oxidizable pollutants absorbing most of said 400 B.t.u./hr./s.c.f.m.

4. A system for the depollution of air containing oxidizable pollutants comprising, in combination, a conduit having a longitudinal axis, infra-red radiation emitting means disposed about the perimeter of said conduit, means for directing a flow of air along a preselected path through said conduit predominantly out of contact with said emitting means at a preselected rate, thereby to cause said flow of air to be subjected to peripheral bombardment by infra-red radiation as it passes through said conduit.

5. A system in accordance with claim 4 wherein the flow of air is directed along the longitudinal axis of the conduit and is restricted to a path substantially along the central portion of said conduit, thereby to minimize the velocity of air proximate to the emitting means.

6. A system for the depollution of air containing oxidizable pollutants comprising, in combination, a conduit having a longitudinal axis, infra-red radiation emitting means disposed about the perimeter of said conduit, means for directing a flow of air through said conduit at a preselected rate to cause the flow or air to be subjected to peripheral bombardment by infra-red radiation as it passes through said conduit, and means for channeling the air flow in a longitudinal direction substantially along the central portion of said conduit thereby to assure that the longitudinal velocity of air proximate to said emitting means is substantially slower than the longitudinal velocity of air in the central portion of said conduit.

7. Apparatus for depolluting a flow of air containing oxidizable pollutants when flowing therethrough comprising, in combination, a hollow shell through which the flow of air is moved in the direction of its longitudinal axis, said shell having an inner surface of an infra-red emitting material, means for heating said material, and barrier means to substantially reduce the longitudinal velocity of air flowing through said shell in the vicinity of said emitting material.

8. Apparatus for depolluting air containing oxidizable pollutants comprising, in combination, an open ended annular elongated furnace member having input and output ends permitting a flow of air therethrough, said furnace member having on its inner surface an infra-red emitting material, means for heating said material, and a plurality of transverse spaced apart baffles disposed proximate to said material to substantially reduce the longitudinal velocity of air flowing through said furnace member in the vicinity of said emitting material thereby to minimize the cooling effect of longitudinally flowing air on said material.

9. Apparatus in accordance with claim 8 wherein said heating means is positioned to effect heating of substantially said entire infra-red emitting material.

10. Apparatus in accordance with claim 8 wherein the means for heating said material comprises a plurality of discharge ports disposed tangentially to the inner surface of said material for supplying a combustible gas, said ports being sufficient in quantity and in position to heat substantially all of said infra-red emitting material.

11. Apparatus in accordance with claim 8 wherein the means for heating said material comprises a plurality of pipes having discharge ports disposed tangentially to the inner surface of said material for supplying a combustible gas, said ports being sufficient in quantity and in position to heat substantially all of said material, and wherein said furnace member is provided with trap members at each end to minimize radiation loss.

12. Apparatus in accordance with claim 8 wherein the input end of said furnace member is provided with an inverted frusto-conical member to direct the flow of air towards the central portion of said furnace member and away from said material.

13. Apparatus for depolluting air containing oxidizable pollutants comprising, in combination, an annular elongated furnace member with a longitudinal axis and having its inner surface lined with an infra-red emitting material, a plurality of concentric rings of refractory bricks disposed within said furnace member proximate to said infra-red emitting material at longitudinally relatively closely spaced apart locations to substantially impede air flow in the vicinity of said lining material thereby to minimize the cooling effect of longitudinally flowing air on said lining material, a pluratlity of pipes having discharge ports disposed tangentially to the inner surface of said lining material to supply combustible gas to the lining material, said pipes being located between the rings of refractory bricks and in sufficient quantity to heat substantially all of said lining material.

References Cited by the Examiner

UNITED STATES PATENTS

| | | | |
|---|---|---|---|
| 765,534 | 7/04 | Williams. | |
| 1,298,889 | 4/19 | Chance | 204—164 |
| 1,808,319 | 6/31 | Roberts | 126—116 X |
| 1,858,637 | 5/32 | McDonald. | |
| 1,992,136 | 2/35 | Wakefield | 23—2 |
| 2,215,079 | 9/40 | Hess | 158—7 X |
| 2,368,827 | 2/45 | Hanson et al. | 158—7 X |
| 2,522,475 | 9/50 | Walker | 23—2 |
| 2,561,200 | 7/51 | Hess. | |
| 2,570,554 | 10/51 | Henwood | 158—7 X |
| 2,728,408 | 12/55 | Deliman. | |
| 2,775,294 | 12/56 | Schwank | 158—116 |
| 2,989,144 | 12/56 | Styrie. | |
| 3,056,467 | 10/62 | Ravich. | |

MORRIS O. WOLK, *Primary Examiner.*

WALTER BERLOWITZ, MAURICE A. BRINDISI,
*Examiners.*